United States Patent [19]

Mason

[11] 4,240,301
[45] Dec. 23, 1980

[54] FREE GYRO MOTOR DRIVE CIRCUIT

[75] Inventor: George D. Mason, Ridgecrest, Calif.

[73] Assignee: The United States of America as represented by the Secretary of the Navy, Washington, D.C.

[21] Appl. No.: 965,806

[22] Filed: Dec. 4, 1978

[51] Int. Cl.$^3$ .............................................. G01C 19/08
[52] U.S. Cl. ..................................... 74/5.7; 74/5.6 E; 318/318; 318/648
[58] Field of Search ....................... 74/5.7, 5.6 E, 5 R; 318/318, 648

[56] References Cited

U.S. PATENT DOCUMENTS

| | | | |
|---|---|---|---|
| 3,044,309 | 7/1962 | Buchhold | 74/5 R |
| 3,209,602 | 10/1965 | Biderman | 74/5.6 |
| 3,456,511 | 7/1969 | Clark et al. | 74/5.4 |
| 3,477,298 | 11/1969 | Howe | 74/5.34 |
| 3,596,523 | 8/1971 | Clark | 74/5.6 |
| 3,886,803 | 6/1975 | Jacobson et al. | 74/5.6 D |
| 3,902,374 | 9/1975 | Hoffman et al. | 74/5.7 X |
| 4,105,935 | 8/1978 | Arai et al. | 318/318 X |

Primary Examiner—Rodney H. Bonce
Attorney, Agent, or Firm—R. S. Sciascia; W. Thom Skeer

[57] ABSTRACT

A system which utilizes a free gyro motor drive circuit to control the speed and rotational direction of a gyro motor. The free gyro motor drive circuit includes a first sensing means for generating a up-down sinusoidal position signal and a second sensing means for generating a right-left sinusoidal position signal, both sinusoidal position signals having a frequency corresponding to the rotational speed of the gyro motor. A direct current error signal is fed into a first speed control circuit means along with the up-down sinusoidal position signal to produce an up-down motor control signal. Similarly, the direct current error signal is fed into a second speed control circuit means along with the right-left sinusoidal position signal to produce a right-left motor control signal. The up-down motor control signal drives a pair of up-down motor coils in the free gyro motor, and the right-left motor control signal drives a pair of right-left motor coils in the free gyro motor.

13 Claims, 3 Drawing Figures

FREE GYRO MOTOR DRIVE CIRCUIT

BACKGROUND OF THE INVENTION

1. Field of the Invention

This invention relates generally to gyroscopic apparatus. In particular, this invention relates to a free gyro motor drive circuit which controls the speed and rotational direction of a gyro motor.

2. Description of Prior Art

A variety of gyro motor drive circuits exist which control both speed and rotational direction of a gyro motor. These circuits employ saturable reactors as gyro motor magnet position sensing devices, thus necessitating the use of complex circuitry to implement the desired speed and rotational direction control of the gyro motor. Also, by using saturable reactors as gyro motor magnet position sensing devices previous gyro motor drive circuits have required considerable space, thus limiting the use of such circuits in missile control applications and other navigation systems.

Further, such circuits are costly, susceptible to noise, and are affected by temperature variations. Therefore, a gyro motor drive circuit is needed which is compact; requires less complex circuitry; is not susceptible to noise or temperature variations; and is cost effective.

SUMMARY OF THE INVENTION

The invention employs a first sensing means for generating a first sinusoidal position signal and a second sensing means for generating a second sinusoidal position signal. Also, the invention employs the generation of a direct current error signal which in conjunction with the first sinusoidal position signal produces a first motor control signal. Similarly, the direct current error signal in conjunction with the second sinusoidal position signal produces a second motor control signal. The resulting motor control signals drive two pairs of motor coils of a gyro motor with speed and rotational direction control for the gyro motor being provided by the direct current error signal.

DETAILED DESCRIPTION OF THE PREFERRED EMBODIMENT

Figure 1:
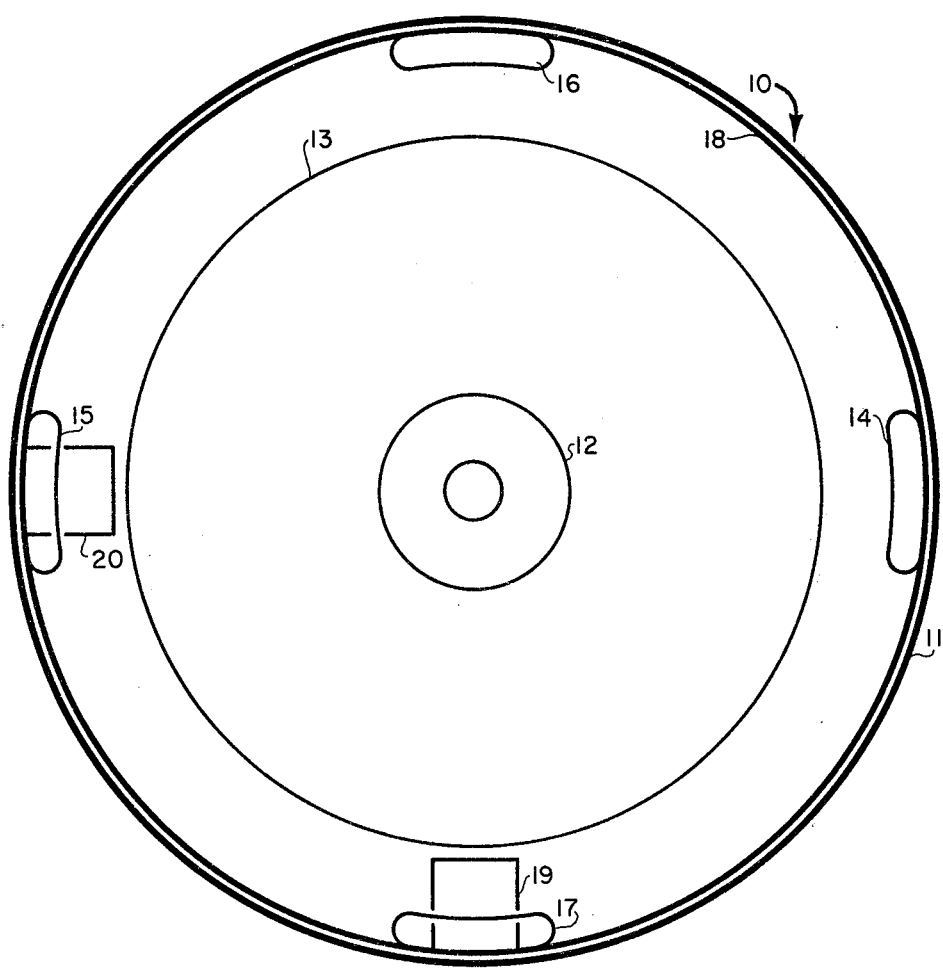
FIG. 1 is a cross-sectional view of a free gyro motor used in the present invention.

Referring to FIG. 1, a gyro motor 10 of the present invention comprises a cylindrical housing 11 which has a shaft 12 rotatable in cylindrical housing 11; and a permanent magnet 13 having a north pole and a south pole, mounted on shaft 12. The combination of shaft 12 and permanent magnet 13 form the rotor of gyro motor 10. The stator of gyro motor 10 includes a first up-down motor coil 16, having an input terminal 24, FIG. 2, connected in series to a second up-down motor coil 17, having an input terminal 21, FIG. 2; and a first right-left motor coil 14, having an input terminal 22, FIG. 2, connected in series to a second right-left motor coil 15, having an input terminal 23, FIG. 2. Up-down motor coil 16, up-down motor coil 17, right-left motor coil 14, and right-left motor coil 15 are mounted on an internal wall 18 of cylindrical housing 11. Further, up-down motor coil 16 is positioned 90° from right-left motor coil 15, 180° from up-down motor coil 17, and 270° from right-left motor coil 14.

A magnetic field intensity sensing transistor 19 and a magnetic field intensity sensing transistor 20 are mounted on internal wall 18 of cylindrical housing 11, and are positioned such that magnetic field intensity sensing transistor 20 is located 90° from magnetic field intensity transistor 19. Further, magnetic field intensity sending transistor 19 is mounted in line with up-down motor coil 17, and magnetic field intensity sensing transistor 20 is mounted in line with right-left motor coil 15 to provide proper phase for maximum torque to gyro motor 10. Magnetic field intensity sensing transistor 19 and magnetic field intensity sensing transistor 20 sense the position of the north pole and the south pole of permanent magnet 13 of gyro motor 10; are Hudson Corporations' model number HM-330; and may be replaced by Hall Effect devices without altering the operational characteristics of the present invention.

Figure 2:
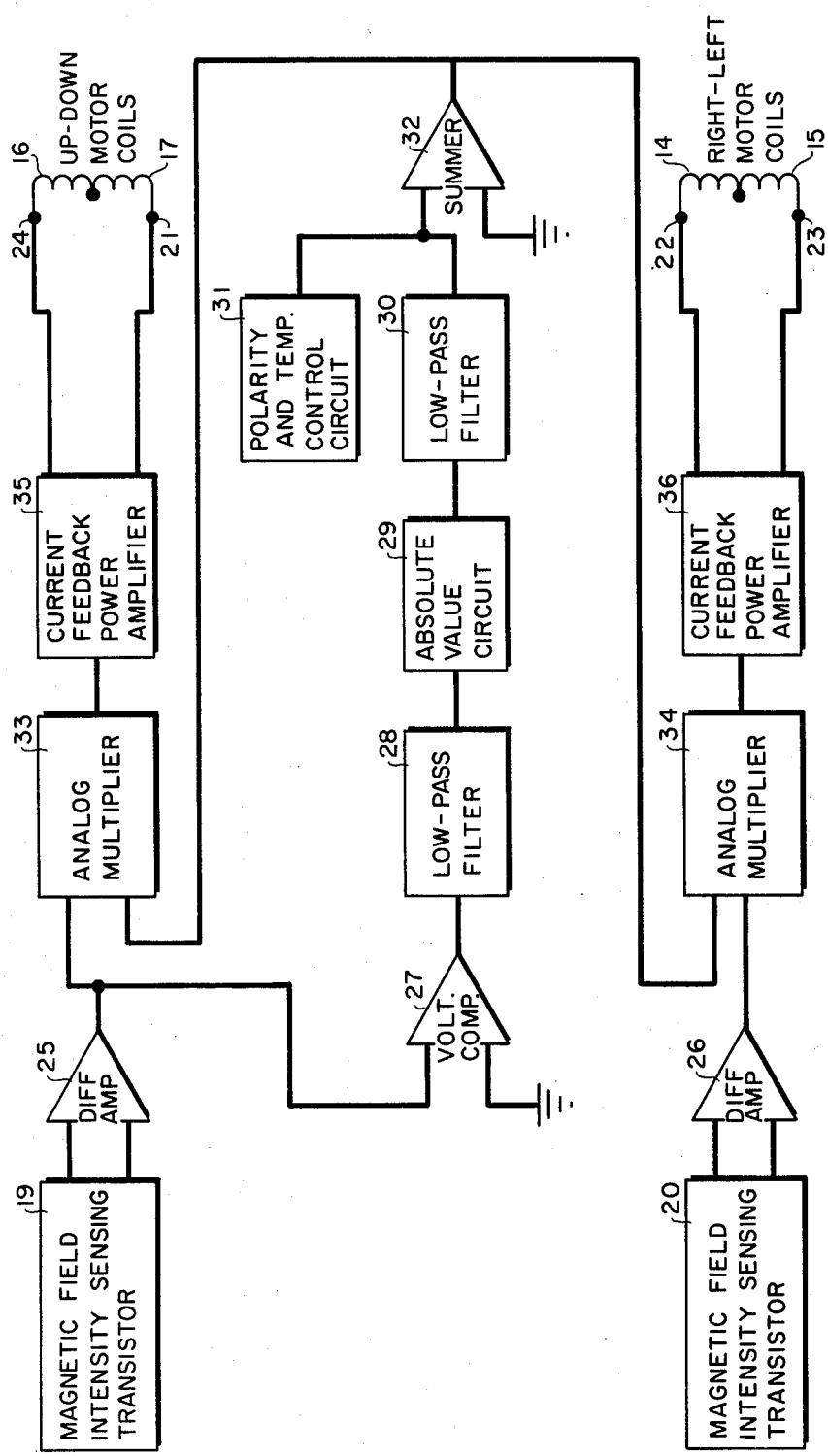
FIG. 2 is an electrical diagram of the circuit used in the present invention.

Referring to FIG. 2, a detailed description of a free gyro motor drive circuit used to implement the desired speed and rotational direction control for gyro motor 10 is illustrated. Magnetic field intensity sensing transistor 19; having a first output connected to a first input of a differential amplifier 25, and a second output connected to a second input of differential amplifier 25; as described previously, senses the position of the north pole and the south pole of permanent magnet 13 of gyro motor 10, FIG. 1. The position of the north pole and the south pole of permanent magnet 13 relative to magnetic field intensity sensing transistor 19 determines the current flow from the first output of magnetic field intensity sensing transistor 19, and the current flow from the second output of magnetic field intensity sensing transistor 19.

Differential amplifier 25 provides an up-down sinusoidal position signal which varies proportionally to the difference between the current flow from the first output of magnetic field intensity sensing transistor 19 and the current flow from the second output of magnetic field intensity sensing transistor 19. This up-down sinusoidal position signal's frequency increases when the rotational speed of gyro motor 10, FIG. 1, increases; and decreases when the rotational speed of gyro motor 10, FIG. 1, decreases.

Voltage comparator 27, having an input connected to the output of differential amplifier 25, converts the up-down sinusoidal position signal to a constant amplitude position signal having the same frequency as the up-down sinusoidal position signal and having a waveform approximating a square wave.

The output of voltage comparator 27 is connected to a low pass filter 28 of conventional design. Low pass filter 28 is designed to have a cutoff frequency of one hundred hertz, which is the normal operating frequency of gyro motor 10. Low pass filter 28 effectively passes the constant amplitude position signals below the cutoff frequency to obtain a fixed amplitude sinusoidal position signal. Further, above the cutoff frequency, the gain of low pass filter 28 decreases by twenty decibels per decade, thus causing the amplitude voltage of the fixed amplitude sinusoidal position signal to decrease proportionally. Below a frequency of ninety seven hertz the gain of low pass filter 28 is approximately eleven decibels.

The output of low pass filter 28 is effectively connected to an absolute value circuit 29, which functions as a full wave rectifier. Absolute value circuit 29, which includes a first operational amplifier connected in series to a second operational amplifier, thus converts the fixed amplitude sinusoidal position signal to a full wave rectified position signal.

The output of absolute value circuit 29 is connected to a low pass filter 30 having a cutoff frequency of ten hertz. Low pass filter 30, which is of conventional design, provides a direct current error signal which represents the average value of the full wave rectified position signal. This direct current error signal, which varies with the operating speed of gyro motor 10, FIG. 1, functions as a control voltage allowing gyro motor 10, FIG. 1, to maintain a constant operating speed.

The output of low pass filter 30 is effectively connected to the input of a summer 32. Also, the output of a polarity and temperature control circuit 31 is effectively connected to the input of summer 32. Polarity and temperature control circuit 31, which comprises a variable resistance network connected in parallel with a temperature compensation diode, varies the frequency at which the direct current error signal changes polarity, and compensates for temperature variations which affect the operational performance of the free gyro motor drive circuit. Summer 32 gains the direct current error signal to provide the proper control loop gain with polarity control for the direct current error signal being provided by polarity and temperature control circuit 31, as discussed previously.

An analog multiplier 33, having a first input connected to the output of differential amplifier 25 and a second input connected to the output of summer 32, provides an up-down motor control signal having an output voltage proportional to the product of the up-down sinusoidal position signal and the direct current error signal. The output of Analog multiplier 33, which may be a signetics model number AD-532, is connected to a current feedback power amplifier 35 of conventional design. Current feedback power amplifier 35, having a first output connected to input terminal 24 of up-down motor coil 16 and a second output connected to input terminal 21 of up-down motor coil 17, amplifies the up-down motor control signal used to drive up-down motor coil 16 and up-down motor coil 17.

Figure 3:
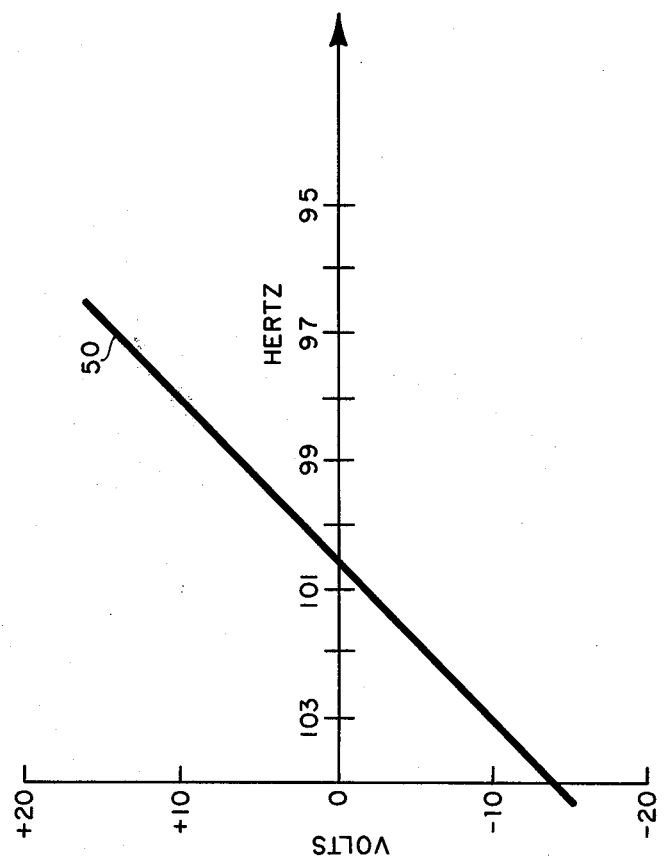
FIG. 3 is a waveform diagram of a direct current reference signal used to control the speed and rotational direction of the gyro motor.

Referring to FIG. 3, a line 50 is shown which represents a plot of the direct current signal, at the output of summer 32, FIG. 2, as a function of the operating speed of gyro motor 10, FIG. 1. When the operating speed of gyro motor 10, FIG. 1, increases the direct current error signal's voltage decreases until the operating speed of gyro motor 10, FIG. 1, reaches 101 Hertz. At 101 Hertz, polarity and temperature control circuit 31, FIG. 2, as discussed previously, causes the direct current error signal to change polarity. Similarly, when the operating speed of gyro motor 10, FIG. 1, decreases the direct current error signal's voltage increases.

Referring to FIGS. 1 and 2, when the operating speed of gyro motor 10 decreases below a normal operating frequency of 100 Hertz, the direct current error signal increases positively, due to low pass filter 28. The direct current error signal is then multiplied times the up-down sinusoidal position signal, by analog multiplier 33, to gain the up-down motor control signal to current feedback power amplifier 35 and bring the operating speed of gyro motor 10 back up to the normal operating frequency. Similarly, when the operating speed of gyro motor 10 increases above the normal operating frequency, the direct current error signal decreases, thereby decreasing the gain to current feedback power amplifier 35, and lowering the operating speed of gyro motor 10 to the normal operating frequency. If the operating speed of gyro motor 10 increases above 101 Hertz, the direct current error signal changes polarity, due to polarity and temperature control circuit 31, resulting in a 180° phase shift of the up-down motor control signal. This 180° phase shift of the up-down motor control signal provides dynamic braking for gyro motor 10 with the 180° phase shift existing only for the time interval necessary to bring the operating speed of gyro motor 10 back to the normal operating frequency.

By virtue of the symmetry of the free gyro motor circuit, analysis of speed and polarity control for right-left motor coil 14, and right-left motor coil 15 is identical and therefore will not be discussed in detail.

While the present invention has been described with reference to a specific embodiment, it will be obvious to those skilled in the art that various changes and modifications may be made without departing from the invention in its broadest aspects.

It is contemplated, therefore, in the appended claims to cover all variations and modifications of the invention which come within the true spirit and scope of the invention.

What is claimed is:

1. A free gyro motor drive circuit comprising:

a gyro motor having a cylindrical housing; a shaft rotatable in said cylindrical housing; a permanent magnet mounted on said shaft; a first up-down motor coil, having an input terminal, connected in series to a second up-down motor coil, having an input terminal, each of said up-down motor coils being mounted on an internal wall of said cylindrical housing and being positioned 180° apart; and a first right-left motor coil, having an input terminal, connected in series to a second right-left motor coil, having an input terminal, each of said right-left motor coils being mounted on said internal wall of said cylindrical housing, being positioned 180° apart, and 90° from said first up-down motor coil;

first sensing means mounted on said internal wall of said cylindrical housing, mounted in line with said first up-down motor coil, and having an output, for generating an up-down sinusoidal position signal having a frequency corresponding to the rotational speed of said gyro motor;

second sensing means; mounted on said internal wall of said cylindrical housing, mounted in line with said first right-left motor coil, located 90° from said first sensing means, and having an output; for generating a right-left sinusoidal position signal having a frequency corresponding to the rotational speed of said gyro motor;

comparing means, having an input connected to said output of said first sensing means and an output, for converting said up-down sinusoidal position signal to a constant amplitude position signal having a frequency identical to the frequency of said up-down sinusoidal position signal;

first filtering means having an input effectively connected to said output of said comparing means and an output for passing said constant amplitude position signals below a predetermined cut off frequency to obtain a fixed amplitude position signal;

absolute value circuit means, having an input operatively connected to said output of said first filtering means and an output, for converting said fixed amplitude sinusoidal position signal to a full wave rectified position signal;

second filtering means, having an input connected to said output of said absolute value circuit means and output, for changing said full wave rectified position signal to a direct current error signal;

polarity and temperature control circuit means, having an output, for determining a frequency at which said direct current error signal will change polarity and to compensate for temperature variations affecting the performance of the free gyro motor drive circuit;

a summer having an input effectively connected to said output of said second filtering means and said output of said polarity and temperature control circuit means;

first speed control circuit means, having a first input connected to said output of said first sensing means, and a second input connected to said output of said summer, for producing an up-down motor control signal having an output voltage proportional to the product of said up-down sinusoidal position signal and said direct current error signal;

second speed control circuit means, having a first input connected to said output of said second sensing means, and a second input connected to said output of said summer for producing a right-left motor control signal having an output voltage proportional to the product of said right-left sinusoidal position signal and said direct current reference signal;

first motor drive circuit means, having an input connected to said output of said first speed control circuit means, a first output effectively connected to said input terminal of said first up-down motor coil, and a second output effectively connected to said input terminal of said second up-down motor coil, for amplifying said up-down motor control signal; and second motor drive circuit means, having an input connected to said output of said second speed control circuit means, a first output effectively connected to said input terminal of said first right-left motor coil and a second output effectively connected to said input terminal of said second right-left motor, for amplifying said right-left motor control signal.

2. A free gyro motor drive circuit according to claim 1 wherein said first sensing means includes:
 a magnetic field intensity sensing transistor having a first output and a second output; and
 a differential amplifier having a first input connected to said first output of said magnetic field intensity sensing transistor, and a second input connected to said second output of said magnetic field intensity sensing transistor.

3. A free gyro motor drive circuit according to claim 1 wherein said first sensing means is a hall effect device.

4. A free gyro motor drive circuit according to claim 1 wherein said second sensing means includes:
 a magnetic field intensity transistor having a first output and a second output; and
 a differential amplifier having a first input connected to said first output of said magnetic field intensity sensing transistor and a second input connected to said second output of said magnetic field intensity transistor.

5. A free gyro motor drive circuit according to claim 1 wherein said second sensing means is a hall effect device.

6. A free gyro motor drive circuit according to claim 1 wherein said comparing means is a voltage comparator.

7. A free gyro motor drive circuit according to claim 1 wherein said first filtering means is a low pass filter with said cutoff frequency being one hundred Hertz.

8. A free gyro motor drive circuit according to claim 1 wherein said absolute value circuit means includes:
 a first operational amplifier having an input connected to said output of said first filtering means; and
 a second operational amplifier having an input connected to said output of said first operational amplifier.

9. A free gyro motor drive circuit according to claim 1 wherein said second filtering means is a low pass filter having a cutoff frequency of ten Hertz.

10. A free gyro motor drive circuit according to claim 1 wherein said first speed control circuit means is an analog multiplier.

11. A free gyro motor drive circuit according to claim 1 wherein said second speed control circuit means is an analog multiplier.

12. A free gyro motor drive circuit according to claim 1 wherein said first motor drive circuit means is a current feedback power amplifier.

13. A free gyro motor drive circuit according to claim 1 wherein said second motor drive circuit means is a current feedback power amplifier.

* * * * *